US012695834B2

(12) United States Patent
Huo et al.

(10) Patent No.: US 12,695,834 B2
(45) Date of Patent: Jul. 28, 2026

(54) SCANNER REDIRECTION METHOD WITH CHUNK-BASED IMAGE RECONSTRUCTION USING CHUNK IDENTIFIERS

(71) Applicant: Omnissa, LLC, Mountain View, CA (US)

(72) Inventors: Huiyong Huo, Beijing (CN); Zhongzheng Tu, Beijing (CN); Mingsheng Zang, Beijing (CN); Kai Xiang, Beijing (CN); Ning Ge, Beijing (CN); Tao Jin, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 18/508,121

(22) Filed: Nov. 13, 2023

(65) Prior Publication Data

US 2025/0106328 A1      Mar. 27, 2025

(30) Foreign Application Priority Data

Sep. 26, 2023    (WO) ................ PCT/CN2023/121325

(51) Int. Cl.
G06F 9/451        (2018.01)
H04N 1/00         (2006.01)
(52) U.S. Cl.
CPC ......... H04N 1/00214 (2013.01); G06F 9/452 (2018.02); H04N 2201/0081 (2013.01)
(58) Field of Classification Search
CPC ........ H04N 1/00214; H04N 2201/0081; G06F 9/452; G06F 16/1752; G06F 3/1241; G06F 3/1273

USPC .............................. 358/1.11–1.15, 1.11–1.18
See application file for complete search history.

(56) References Cited

U.S. PATENT DOCUMENTS 11,704,634 B1      7/2023   Medina, III
11,716,428 B1 *    8/2023   Tu ..................... H04N 1/00037
                                                              358/1.15
11,750,749 B1 *    9/2023   Tu ..................... H04N 1/00018
                                                              358/1.13
2006/0070090 A1    3/2006   Gulkis
2006/0222065 A1   10/2006   Ramakrishnan
(Continued)

OTHER PUBLICATIONS

"Document Scanner—Twain, Wia, Isis or SANE," Jan. 7, 2020, Dynamsoft, 5 pages, https://www.dynamsoft.com/blog/insights/document-scanning-twain-wia-isis-sane.

(Continued)

*Primary Examiner* — Chad Dickerson
(74) *Attorney, Agent, or Firm* — Kim & Stewart LLP

(57) ABSTRACT

A scanner redirection method for a remote desktop system includes the steps of: transmitting to a client computer, a request to acquire a first image from an image capturing device connected to the client computer; in response to receiving image data from the client computer of a first chunk of the first image and an identifier (ID) of the first chunk, storing the image data of the first chunk and the ID of the first chunk in association with each other; in response to receiving an ID from the client computer of a second chunk of the first image without any associated image data, retrieving image data that is stored in association with the ID of the second chunk; and creating the first image using the image data of the first chunk and the retrieved image data that is stored in association with the ID of the second chunk.

20 Claims, 9 Drawing Sheets

(56) References Cited

U.S. PATENT DOCUMENTS

| | | |
|---|---|---|
| 2006/0256858 A1 | 11/2006 | Chin |
| 2007/0211310 A1 | 9/2007 | Kadota |
| 2008/0297812 A1 | 12/2008 | Watanabe |
| 2009/0080035 A1 | 3/2009 | Downs |
| 2009/0091555 A1 | 4/2009 | Do |
| 2011/0055765 A1 | 3/2011 | Neubrand |
| 2012/0128058 A1 | 5/2012 | Bakharov |
| 2013/0198462 A1* | 8/2013 | Serlet .................. G06F 12/0866 |
| | | 711/170 |
| 2016/0198081 A1* | 7/2016 | Thomas ................. H04N 7/181 |
| | | 348/211.3 |
| 2017/0127095 A1* | 5/2017 | Park ................. H04N 21/23106 |
| 2018/0234517 A1 | 8/2018 | Venkatesh |
| 2021/0092238 A1 | 3/2021 | Gill |

OTHER PUBLICATIONS

Non-Final Office Action dated Aug. 28, 2025 in related U.S. Appl. No. 18/531,492.

* cited by examiner

100

SCANNER REDIRECTION METHOD WITH CHUNK-BASED IMAGE RECONSTRUCTION USING CHUNK IDENTIFIERS

CROSS-REFERENCE

This application is based upon and claims the benefit of priority from International Patent Application No. PCT/CN2023/121325, filed on Sep. 26, 2023, the entire contents of which are incorporated herein by reference.

BACKGROUND

Many organizations rely on remote desktop (RD) services to provide lean, flexible computing environments. RD scanning is one important feature required by the end user of an RD session. Through RD scanning, an application executing on a remote (agent) computer such as a server acquires images from client-side image capturing devices (ICDs) such as scanners and digital cameras. Specifically, through scanner redirection, the remote computer transmits a request for an image to a client computer such as a laptop, the client computer being connected to an ICD. The client computer then acquires the image from the ICD and transmits it to the remote computer.

Because scanner redirection involves the client computer transmitting images to the remote computer, scanner redirection consumes bandwidth of one or more networks between the client and remote computers. Accordingly, especially when scanner redirection is used by the remote computer to acquire large images and/or large numbers of images, the transmission of image data causes congestion on the network(s). A method is thus desired for acquiring images through scanner redirection in a manner that minimizes the burden placed on networks.

SUMMARY

Accordingly, embodiments provide for an RD computer system, wherein the RD computer system includes a client computer and a virtual machine (VM) executing on a remote computer. The client computer includes RD software that is configured to communicate with ICDs. According to one embodiment, the RD software includes a "data source," which is the component that communicates with the ICDs. According to another embodiment, the RD software includes an image capture core, which is a service that exposes application programming interfaces (APIs) for communicating with the ICDs. The APIs are used for, e.g., adjusting settings of the ICDs and requesting images therefrom.

Embodiments provide a scanner redirection method for such an RD system including a client computer and a remote computer, wherein the client computer has an RD session with the remote computer. The scanner redirection method includes the steps of: transmitting by the remote computer to the client computer, a request to acquire a first image from an image capturing device connected to the client computer; in response to receiving image data from the client computer of a first chunk of the first image and an identifier (ID) of the first chunk, storing by the remote computer, the image data of the first chunk and the ID of the first chunk in association with each other; in response to receiving an ID from the client computer of a second chunk of the first image without any associated image data, retrieving by the remote computer, image data that is stored by the remote computer in association with the ID of the second chunk; and creating by the remote computer, the first image using the image data of the first chunk and the retrieved image data that is stored in association with the ID of the second chunk.

Further embodiments include a non-transitory computer-readable storage medium comprising instructions that cause an RD computer system to carry out the above method, as well as a remote computer configured to carry out the above method.

DETAILED DESCRIPTION

Figure 1:
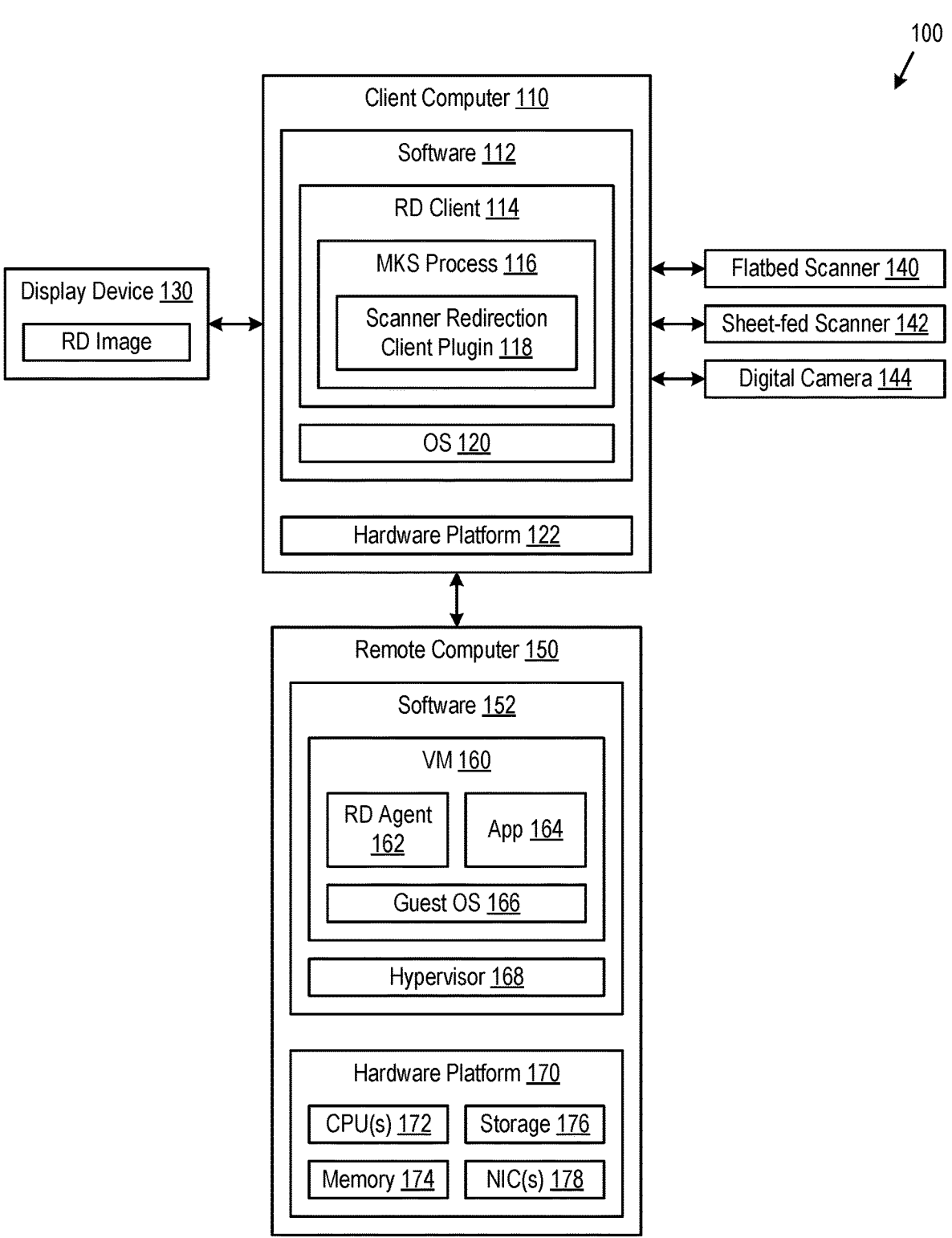
FIG. 1 is a block diagram of an RD computer system in which embodiments may be implemented.

Techniques are described for realizing scanner redirection during an RD session between a client computer and a remote computer. A VM running in the remote computer executes an application for the RD session. The application consumes images from a plurality of ICDs, and the ICDs are connected to the client computer. To acquire the images, the application requests the images from an application of the client computer, referred to herein as an RD client application. The RD client application acquires the images from the ICDs and transmits them to the application of the VM in the remote computer.

According to a first embodiment, the client computer and the VM utilize the same scanning protocol such as the TWAIN protocol. Pursuant to the common scanning protocol, the RD client application and the application of the VM utilize "data source managers" (DSMs) and "data sources" (DSs). For the application of the VM, its respective data source manager communicates with a "virtual" data source, the virtual data source requesting images from the client computer. For the client computer, its respective data source manager communicates with data sources that acquire images from ICDs.

According to a second embodiment, the client computer has a different OS than that of the VM. As a result, the client computer uses one scanning protocol such as the Image Capture (ICA) Framework, and the VM uses another scanning protocol such as the TWAIN protocol. Pursuant to its respective scanning protocol, the VM still utilizes a data source manager and a virtual data source. Pursuant to the other scanning protocol, the client computer utilizes an "image capture core" that communicates directly with ICDs (not through separate data source components) to acquire images.

When the client computer acquires an image, it divides the image into a plurality of "chunks" of a predetermined size and generates a hash of each chunk. As used herein, a chunk is a portion of the image data of an image. The client computer then uses the hashes to determine which chunks are unique and which are identical. For example, two chunks may be identical because they are each part of the background of an image, and the background of the image is simply a solid color. For chunks that are unique, the client computer transmits both the chunk and the hash to the remote computer. For chunks that are identical to each other, the client computer only transmits the chunk to the remote computer once and transmits the hash once for each of the identical chunks.

When the VM of the remote computer receives a chunk and a hash, the VM stores the chunk and hash in a data structure in association with each other. When the VM receives only a hash, the VM determines the chunk associated therewith by locating the hash in the data structure and extracting the corresponding chunk. The hash thus acts as an identifier (ID) of the associated chunk. Once the VM has acquired each chunk of an image, the VM creates the image from the constituent chunks. Additionally, if there are more images for the remote computer to acquire, the client computer and the VM repeat the process, reusing any stored chunks and hashes.

For many images, there are several chunks that are identical to each other. Accordingly, by only transmitting such chunks from the client computer to the VM once, techniques significantly reduce the bandwidth consumption for scanner redirection. Such savings are increasingly significant when the application of the VM acquires large images or large numbers of images. These and further aspects of the invention are discussed below with respect to the drawings.

FIG. 1 is a block diagram of an RD computer system 100 in which embodiments may be implemented. RD computer system 100 includes a client computer 110 and a remote (agent) computer 150 (remote from client computer 110). For example, client computer 110 may be a laptop, desktop computer, or server in a private data center controlled by a particular organization. Remote computer 150 may be, e.g., a server provisioned in a private data center controlled by the organization or a server provisioned in a public data center that includes servers of other organizations.

Client computer 110 is constructed on a hardware platform 122 such as an x86 architecture platform. Hardware platform 122 includes conventional components of a computing device (not shown), such as one or more central processing units (CPUs), memory such as random-access memory (RAM), local storage such as one or more magnetic drives or solid-state drives (SSDs), and one or more network interface cards (NICs). The NICs enable client computer 110 to communicate with remote computer 150 over a network (not shown) such as the Internet.

Hardware platform 122 supports software 112, which includes an RD client application 114 running on a commodity operating system (OS) 120. For example, RD client 114 may be VMware Horizon® Client, available from VMware, Inc. The term "desktop" in remote desktop (RD) refers to an instance of an interactive environment provided by an OS and software applications, typically in the form of display and sound output and keyboard and mouse input. Through RD client 114, a user of the organization accesses an RD from any location. RD client 114 includes a mouse, keyboard, screen (MKS) process 116, which receives images of an RD from remote computer 150. RD client 114 then communicates with a display device 130 such as a monitor on which the user views the RD images.

When the user performs actions in the RD such as clicking a computer mouse or typing on a keyboard, the user's actions are received by MKS process 116. MKS process 116 transmits the user's actions to remote computer 150 to update the RD accordingly. MKS process 116 includes a scanner redirection client plugin 118, which acquires images from ICDs connected to client computer 110, including a flatbed scanner 140, a sheet-fed scanner 142, and a digital camera 144. Client computer 110 transmits images from the ICDs to remote computer 150.

In embodiments illustrated herein, an RD runs in a VM 160 of remote computer 150. Remote computer 150 includes software 152 and a hardware platform 170. Hardware platform 170 is, e.g., an x86 architecture platform including the conventional components of a computer described above for hardware platform 122, including a CPU(s) 172, local memory 174, storage 176, and a NIC(s) 178. CPU(s) 172 are configured to execute instructions such as executable instructions that perform one or more operations described herein, which may be stored in memory 174. NIC(s) 178 enable remote computer 150 to communicate with client computer 110, e.g., over the Internet.

Software 152 includes a hypervisor 168, which is a virtualization software layer that supports a VM execution space within which VMs such as VM 160 are concurrently instantiated and executed. One example of hypervisor 168 is a VMware ESX® hypervisor, available from VMware, Inc. VM 160 includes an RD agent application 162 and an application 164 running on a commodity guest OS 166. RD agent 162 communicates with RD client 114 to establish an RD session for the user. As mentioned earlier, as part of the RD session, RD agent 162 periodically transmits an updated RD image to MKS process 116 of RD client 114 to be displayed on display device 130. RD client 114 and RD agent 162 are also referred to individually and collectively herein as RD software.

Application 164 consumes images created by the ICDs connected to client computer 110. To do so, application 164 is modified to handle scanner redirection with the RD software. For example, application 164 may be Adobe Photoshop® which the user accesses through the RD session. A particular configuration of RD computer system 100 is illustrated in FIG. 1, but it should be recognized that one or more embodiments may be practiced with other computer system configurations.

Figure 2:
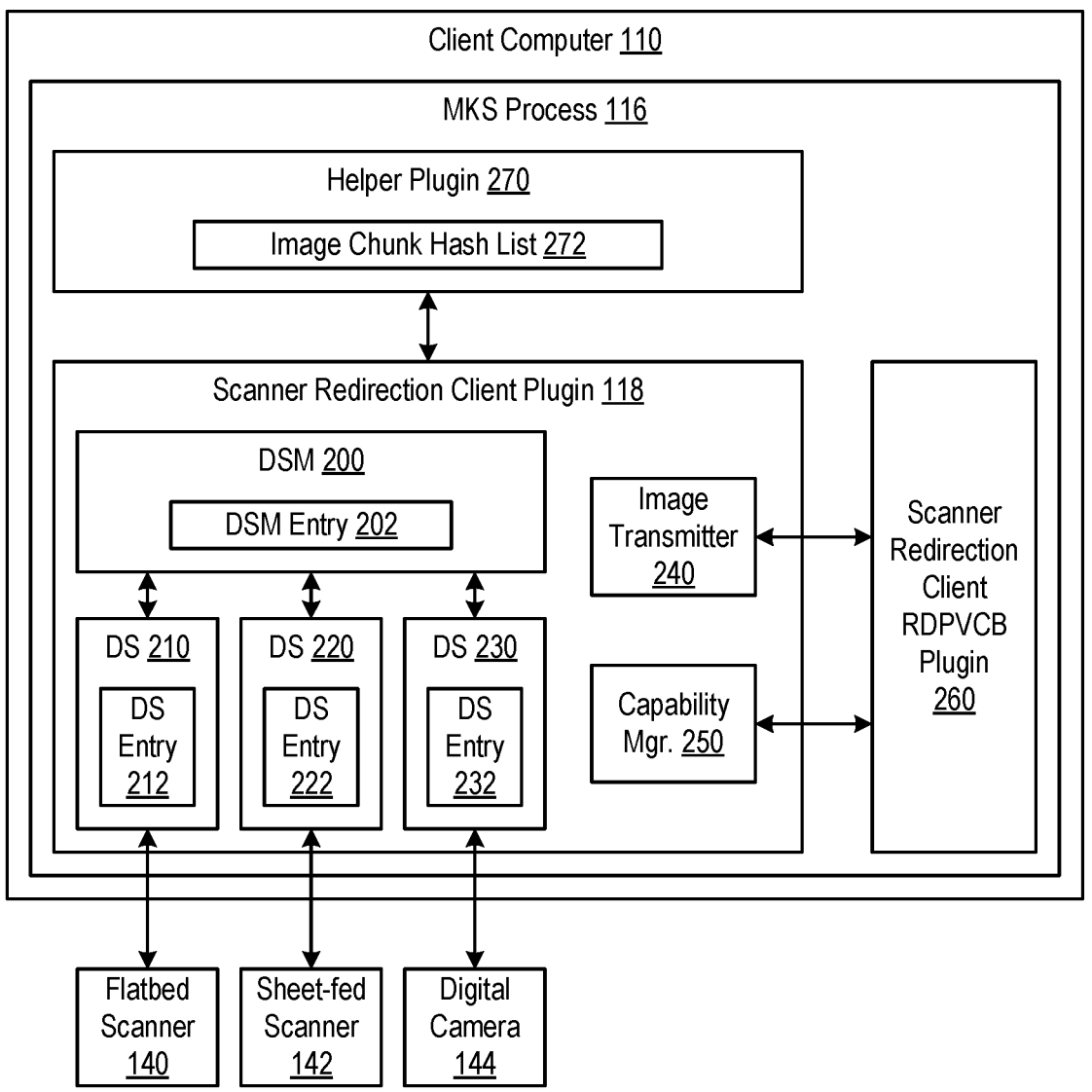
FIG. 2 is a block diagram of a client computer of the RD computer system and a group of ICDs connected to the client computer, according to a first embodiment.

FIG. 2 is a block diagram of client computer 110 and the ICDs connected thereto, according to the first embodiment. According to the first embodiment, client computer 110 uses the same scanning protocol as VM 160, e.g., the TWAIN protocol. In the example of FIG. 2, there are three drivers (not shown) installed in client computer 110 for controlling the depicted ICDs: one for controlling flatbed scanner 140, one for sheet-fed scanner 142, and one for digital camera 144.

In addition to scanner redirection client plugin 118, MKS process 116 includes a scanner redirection client remote desktop protocol virtual channel bridge (RDPVCB) plugin 260 and a helper plugin 270. Client RDPVCB plugin 260 is communication software that is configured to communicate with VM 160 via transmission control protocol (TCP) or user datagram protocol (UDP) channels. Such channels are established between client RDPVCB plugin 260 and VM 160, as discussed further below. Client RDPVCB plugin 260 is also configured to communicate with an image transmitter 240 and a capability manager 250.

Scanner redirection client plugin 118 includes a DSM 200, which communicates with DSs 210, 220, and 230 to acquire images from ICDs. To initiate such communication, scanner redirection client plugin 118 calls a DSM entry function 202 to provide commands to DSM 200. DSM 200 then calls a DS entry function 212, 222, or 232 to transmit commands to DS 210, 220, or 230, respectively. The called DS then returns results to DSM 200 via return values of the DS entry call. Similarly, DSM 200 returns results to scanner redirection client plugin 118 via DSM entry 202 return values.

When one of the DSs acquires an image from a corresponding ICD, scanner redirection client plugin 118 transmits the image to helper plugin 270. Helper plugin 270 divides the image into a plurality of chunks of a predetermined size and generates a hash of each chunk. Helper plugin 270 stores each unique chunk in an image chunk hash list 272. For each unique chunk, image transmitter 240 transmits the chunk to VM 160 via client RDPVCB plugin 260. For all chunks, image transmitter 240 also transmits the hash to VM 160 via client RDPVCB plugin 260.

In addition to acquiring images, any of the DSs may acquire capabilities from a corresponding ICD such as different supported resolutions for acquired images. Capability manager 250 transmits the capabilities to VM 160 via client RDPVCB plugin 260. If the user specifies to adjust settings for a particular ICD, scanner redirection client plugin 118 instructs the corresponding DS via DSM 200 to control the ICD to adjust those settings.

Figure 3:
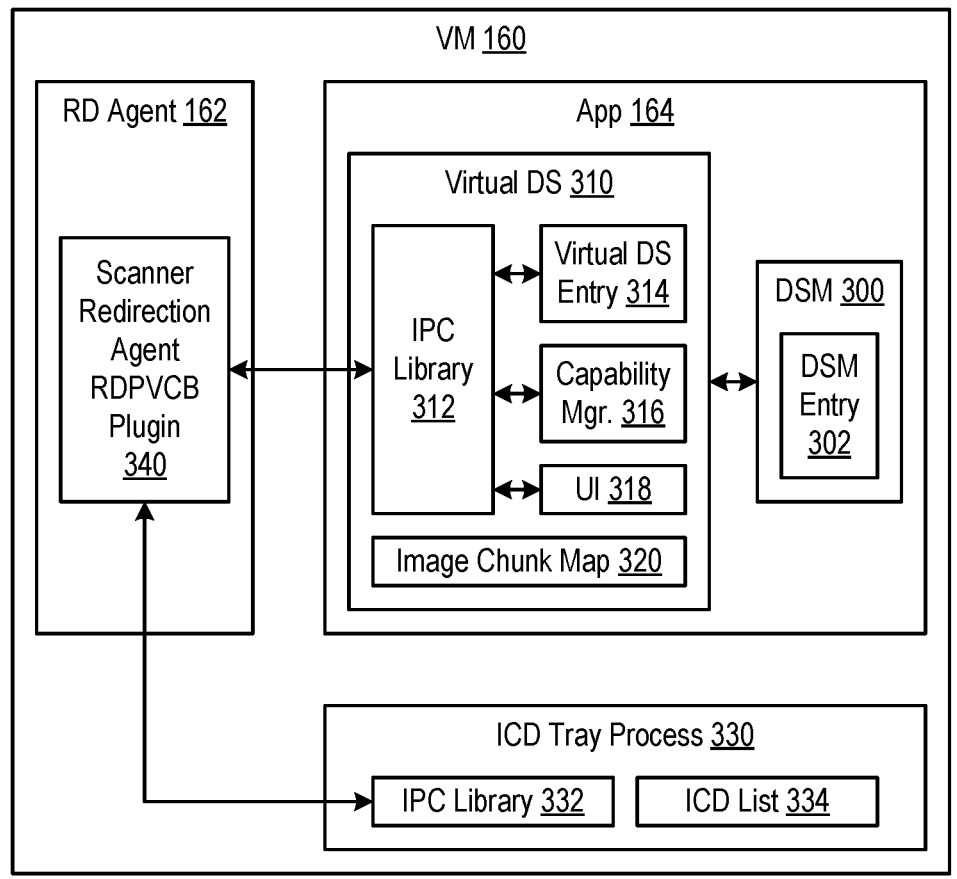
FIG. 3 is a block diagram of a VM of a remote computer of the RD computer system, according to embodiments.

FIG. 3 is a block diagram of VM 160, according to embodiments. In addition to RD agent 162 and application 164, VM 160 also includes an ICD tray process 330. As part of the RD session, the user accesses application 164 and ICD tray process 330 from client computer 110. RD agent 162 includes a scanner redirection agent RDPVCB plugin 340. Agent RDPVCB plugin 340 is communication software that is configured to communicate with client computer 110 via TCP or UDP channels. Those channels are established between agent RDPVCB plugin 340 and client RDPVCB plugin 260 of client computer 110 to facilitate communications of the RD session. Agent RDPVCB plugin 340 is also configured to communicate with application 164 and with ICD tray process 330.

Using ICD tray process 330, the user selects ICDs connected to client computer 110 for scanner redirection functionalities. ICD tray process 330 includes an inter-process communication (IPC) library 332, which facilitates communications with agent RDPVCB plugin 340. ICD tray process 330 also includes an ICD list 334, which is a list of ICDs for which drivers have been installed in client computer 110, the list having been transmitted earlier by client computer 110 to VM 160. For example, to interact with ICD tray process 330, the user may click a toolbar menu item in VM 160, which results in ICD tray process 330 showing the contents of ICD list 334. Upon the user selecting an ICD for acquiring images from, ICD tray process 330 transmits an ID of the selected ICD to client computer 110 via IPC library 332 and agent RDPVCB plugin 340.

Application 164 includes a DSM 300 that communicates with a virtual DS 310. Instead of communicating directly with ICDs, virtual DS 310 communicates with client computer 110, e.g., to request images. Specifically, application 164 calls a DSM entry function 302 to transmit commands to DSM 300. DSM 300 then calls a virtual DS entry function 314 to transmit commands to virtual DS 310. Virtual DS 310 also returns results to DSM 300 via return values of virtual DS entry 314 calls. Similarly, DSM 300 returns results via DSM entry 302 return values.

In addition to virtual DS entry 314, virtual DS 310 includes an IPC library 312, a capability manager 316, a user interface (UI) 318, and an image chunk map 320. IPC library 312 facilitates communications between agent RDPVCB plugin 340, virtual DS entry 314, capability manager 316, and UI 318. Capability manager 316 caches capabilities of ICDs such as different resolutions those ICDs can acquire images at, those capabilities being received from capability manager 250 of client computer 110. Capability manager 316 transmits those capabilities to UI 318 to be displayed to the user. Then, via UI 318, the user adjusts various settings such as which resolution to acquire images at. Capability manager 316 transmits specified adjustments to client computer 110 via IPC library 312 and agent RDPVCB plugin 340 to be applied to selected ICDs.

Through UI 318, the user also triggers the acquiring of images by selected ICDs. Such requests are transmitted to client computer 110 via IPC library 312 and agent RDPVCB plugin 340, and then images are received from client computer 110. Specifically, chunks and hashes of such chunks are received by virtual DS 310 via IPC library 312 and agent RDPVCB plugin 340. When a chunk and a corresponding hash are both received, virtual DS 310 stores them in image chunk map 320 in association with each other.

In image chunk map 320, each hash is a key, and the chunk associated therewith is a value corresponding to the key. When only a hash is received from client computer 110 for a particular chunk (and the chunk itself is not received from client computer 110), virtual DS 310 extracts the associated chunk from image chunk map 320 using the hash as a key. Once virtual DS 310 acquires all the chunks for an image, virtual DS 310 combines the chunks to form the image. Virtual DS 310 then returns the image to DSM 300 via virtual DS entry 314 to be provided to application 164 via DSM entry 302.

Figure 4:
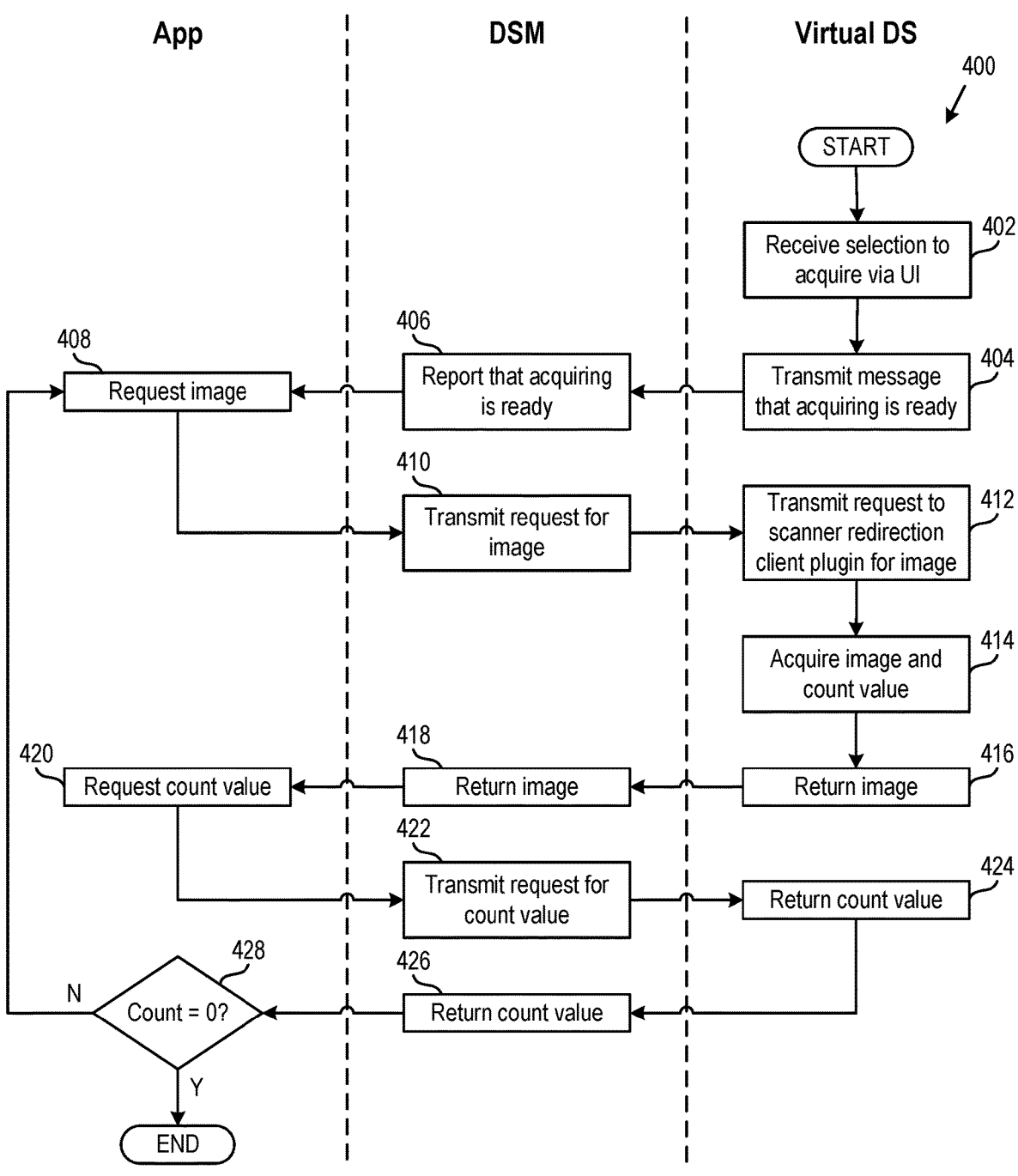
FIG. 4 is a flow diagram of a method performed by the VM of the remote computer to acquire one or more images from a selected ICD, according to embodiments.

FIG. 4 is a flow diagram of a method 400 performed by VM 160 to acquire one or more images from a selected ICD, according to embodiments. At step 402, virtual DS 310 receives a selection via UI 318 to acquire an image. For example, the user may click an "acquire" button of UI 318 to trigger the selection. At step 404, virtual DS 310 transmits a message to DSM 300 indicating that acquiring is ready. At step 406, DSM 300 reports to application 164 that acquiring is ready. At step 408, application 164 calls DSM entry 302 to request an image from DSM 300.

At step 410, DSM 300 calls virtual DS entry 314 to transmit a request to virtual DS 310 for the image. At step 412, virtual DS 310 transmits a request to scanner redirection client plugin 118 via a TCP or UDP channel between client RDPVCB plugin 260 and agent RDPVCB plugin 340. As mentioned earlier, virtual DS 310 communicates with RDPVCB plugin 340 by IPC via IPC library 312. The request to scanner redirection client plugin 118 is for an image from an ICD, the ICD being previously selected by the user via ICD tray process 330 and communicated by ICD tray process 330 to scanner redirection client plugin 118. Step 412 triggers the method of FIG. 5, as discussed further below.

At step 414, virtual DS 310 acquires the image and a "count" value. Count is a variable received from scanner redirection client plugin 118 indicating whether there are any pending images yet to be acquired from the selected ICD. A count value of zero indicates that there are no pending images. A nonzero value indicates that there is at least one pending image. The acquiring of the image and count value is discussed below in conjunction with FIGS. 5-7.

At step 416, virtual DS 310 transmits the image to DSM 300 as a return value of the call to virtual DS entry 314. At step 418, DSM 300 provides the image to application 164 as a return value of the call to DSM entry 302. At step 420, application 164 calls DSM entry 302 to request DSM 300 for the count value. At step 422, DSM 300 calls virtual DS entry 314 to transmit a request to virtual DS 310 for the count value. At step 424, virtual DS 310 transmits the count value to DSM 300 as a return value of the call to virtual DS entry 314. At step 426, DSM 300 provides the count value to application 164 as a return value of the call to DSM entry 302. At step 428, application 164 checks if the count value is zero. If the count value is nonzero, method 400 returns to step 408, and application 164 calls DSM entry 302 to request another image from DSM 300. Otherwise, if the count value is zero, method 400 ends.

Figure 5:
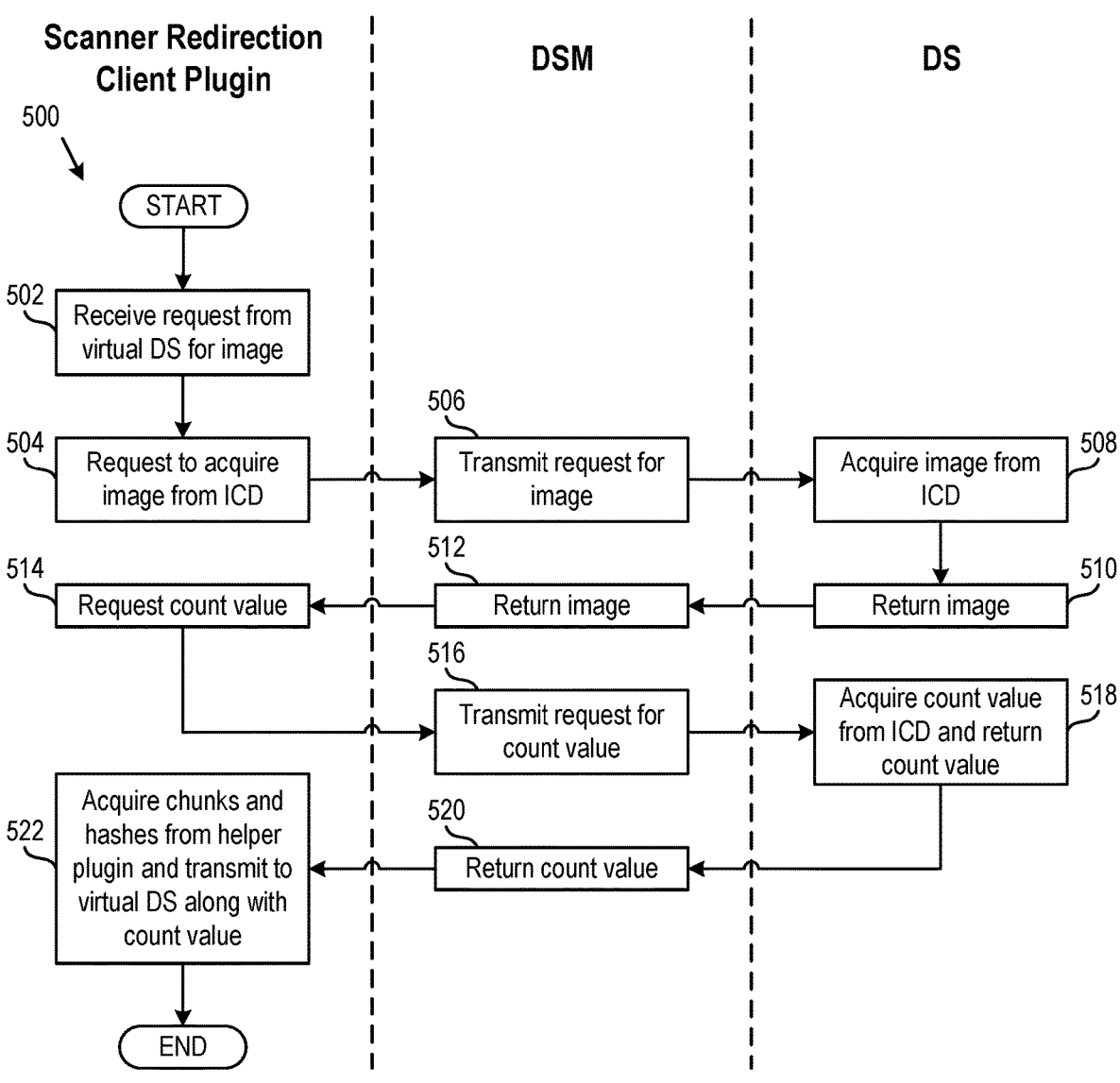
FIG. 5 is a flow diagram of a method performed by the client computer to acquire an image from a selected ICD, according to the first embodiment.

FIG. 5 is a flow diagram of a method 500 performed by client computer 110 to acquire an image from a selected ICD, according to the first embodiment. At step 502, scanner redirection client plugin 118 receives a request from virtual DS 310 via a TCP or UDP channel between client RDPVCB plugin 260 and agent RDPVCB plugin 340. The request is to acquire an image. At step 504, scanner redirection client plugin 118 calls DSM entry 202 to request DSM 200 to acquire an image.

At step 506, DSM 200 calls a DS entry to transmit a request to a DS for the image. For example, if the user previously selected flatbed scanner 140 from ICD tray process 330, DS 210 has already been loaded by scanner redirection client plugin 118 and has already opened a communication session with flatbed scanner 140, and DSM 200 calls DS entry 212 to transmit the request to DS 210. At step 508, the requested DS communicates with the selected ICD to acquire the image therefrom. At step 510, the requested DS transmits the image to DSM 200 as a return value of the call to the DS entry.

At step 512, DSM 200 provides the image to scanner redirection client plugin 118 as a return value of the call to DSM entry 202. At step 514, scanner redirection client plugin 118 calls DSM entry 202 to request DSM 200 for a count value. At step 516, DSM 200 calls the DS entry, e.g., DS entry 212, to transmit a request to the DS, e.g., DS 210, for the count value. At step 518, the DS acquires the count value from the selected ICD and returns the count value to DSM 200 as a return value of the call to the DS entry.

At step 520, DSM 200 provides the count value to scanner redirection client plugin 118 as a return value of the call to DSM entry 202. At step 522, scanner redirection client plugin 118 acquires chunks and hashes for the image from helper plugin 270. Scanner redirection client plugin 118 then transmits chunks and hashes to virtual DS 310 along with the count value. Step 522 is discussed further below in conjunction with FIG. 6. After step 522, method 500 ends.

Figure 6:
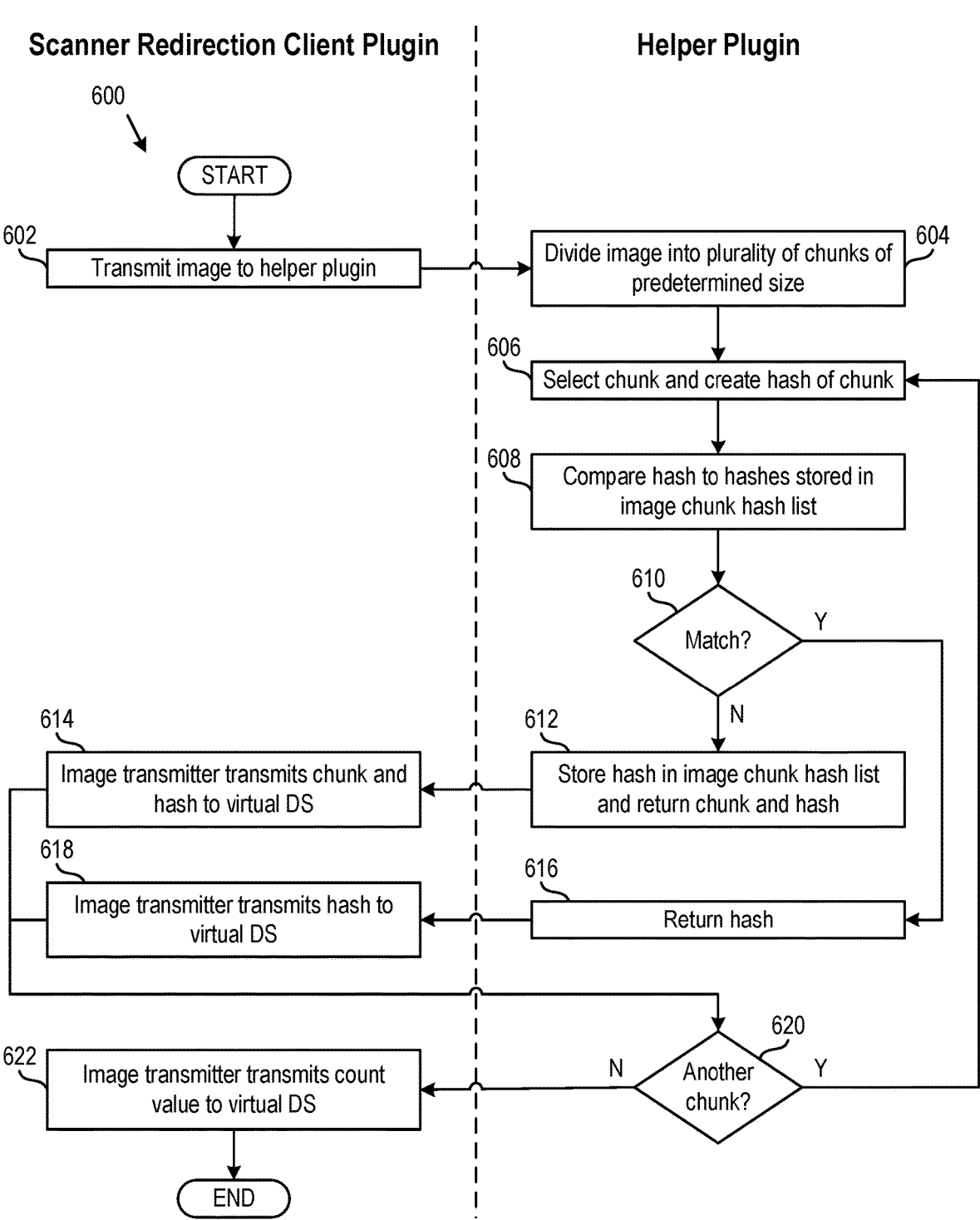
FIG. 6 is a flow diagram of a method performed by the client computer to divide the image from the ICD into chunks and to transmit image information to the remote computer for each of the chunks, according to embodiments.

FIG. 6 is a flow diagram of a method 600 performed by client computer 110 to divide an image from an ICD into chunks and to transmit image information to virtual DS 310 for each of the chunks, according to embodiments. As used herein "image information" means either (1) a chunk and a hash of the chunk or (2) just the hash of the chunk. Method 600 is discussed with respect to the first embodiment but also applies to the second embodiment. If performed according to the second embodiment, steps discussed as being performed by helper plugin 270 are instead performed by a helper 850 of the second embodiment, which is discussed further below in conjunction with FIG. 8.

At step 602, scanner redirection client plugin 118 transmits the image to help plugin 270. At step 604, helper plugin 270 divides the image into a plurality of chunks of a predetermined size. At step 606, helper plugin 270 selects one of the chunks and creates a hash of the chunk. Helper plugin 270 creates the hash by inputting the chunk into a hash algorithm such as the MD5 message-digest algorithm. At step 608, helper plugin 270 compares the hash to hashes stored in image chunk hash list 272.

At step 610, if there was no match, i.e., if helper plugin 270 did not find an identical hash in image chunk hash list 272, method 600 moves to step 612. At step 612, helper plugin 270 stores the hash in image chunk hash list 272 and transmits the chunk and the hash to scanner redirection client plugin 118. As mentioned earlier, helper plugin 270 stores the hash for comparison to hashes of later chunks to be analyzed. At step 614, image transmitter 240 transmits the chunk and the hash to virtual DS 310 via a TCP or UDP channel between client RDPVCB plugin 260 and agent RDPVCB plugin 340. Returning to step 610, if there was a match, i.e., if helper plugin 270 found an identical hash in image chunk hash list 272, method 600 moves to step 616.

At step 616, helper plugin 616 transmits the hash to scanner redirection client plugin 118. At step 618, image transmitter 240 transmits the hash to virtual DS 310 via the TCP or UDP channel. Image transmitter 240 only transmits the hash (not the chunk itself) because image transmitter 240 has already transmitted an identical chunk to virtual DS 310. Virtual DS 310 is thus able to determine the chunk based on the hash, as discussed further below in conjunction with FIG. 7. It should be noted that a hash of a chunk is significantly smaller than the chunk itself, so step 618 uses significantly less bandwidth than step 614.

At step 620, if there is another chunk of the image for helper plugin 270 to analyze, method 600 returns to step 606, and helper plugin 270 selects another chunk and creates a hash thereof. Otherwise, if there are no more chunks to analyze, method 600 moves to step 622. At step 622, image transmitter 240 transmits a count value to virtual DS 310. The count value was obtained from an ICD, as discussed above. After step 622, method 600 ends.

Figure 7:
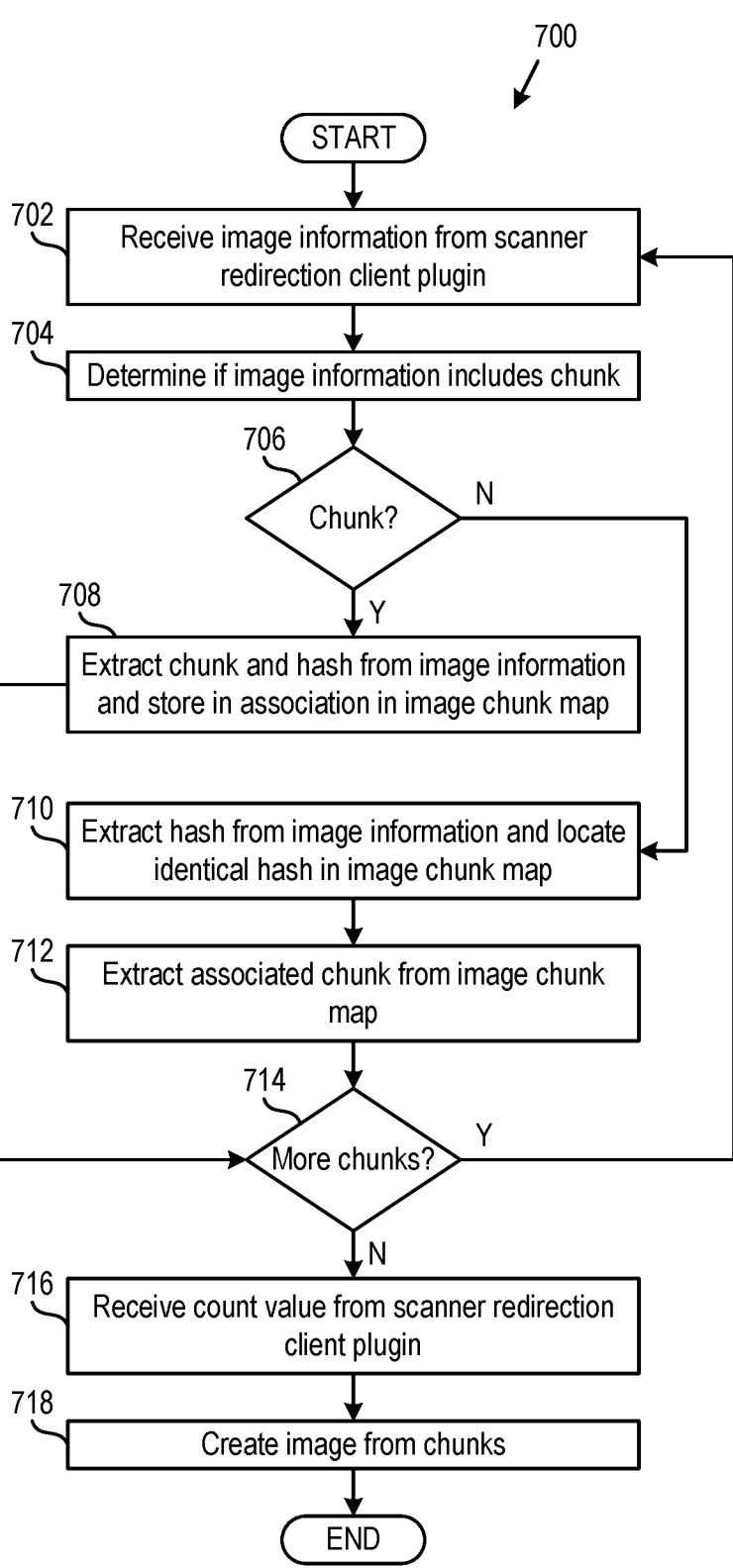
FIG. 7 is a flow diagram of a method performed by the VM of the remote computer to create the image based on the image information transmitted by the client computer, according to embodiments.

FIG. 7 is a flow diagram of a method 700 performed by virtual DS 310 of VM 160 to create an image based on image information received from client computer 110, according to embodiments. At step 702, virtual DS 310 receives the image information from scanner redirection client plugin 118 via a TCP or UDP channel between client RDPVCB plugin 260 and agent RDPVCB plugin 340. If the image information corresponds to a chunk for which an identical chunk has previously been received, the image information only includes the corresponding hash. Otherwise, the image information includes both the chunk and the hash.

At step 704, virtual DS 310 determines if the image information includes the chunk. At step 706, if the image information includes the chunk, method 700 moves to step 708. At step 708, virtual DS 310 extracts the chunk and the corresponding hash from the image information and stores them in association with each other in image chunk map 320. Returning to step 706, if the image information does not include the chunk, method 700 moves to step 710. At step 710, virtual DS 310 extracts the hash from the image information and locates a key in image chunk map 320 that is an identical hash. At step 712, virtual DS 310 extracts the chunk associated with the identical hash from image chunk map 320.

At step 714, if there are more chunks to be acquired for the image, method 700 returns to step 702, and virtual DS 310 receives image information from scanner redirection client plugin 118 for a next chunk. Otherwise, if all chunks have been acquired by virtual DS 310 for the image, method 700 moves to step 716. At step 716, virtual DS 310 receives a count value from scanner redirection client plugin 118. At step 718, virtual DS 310 creates the image from all the chunks extracted at steps 708 and 712. After step 718, method 700 ends.

Figure 8:
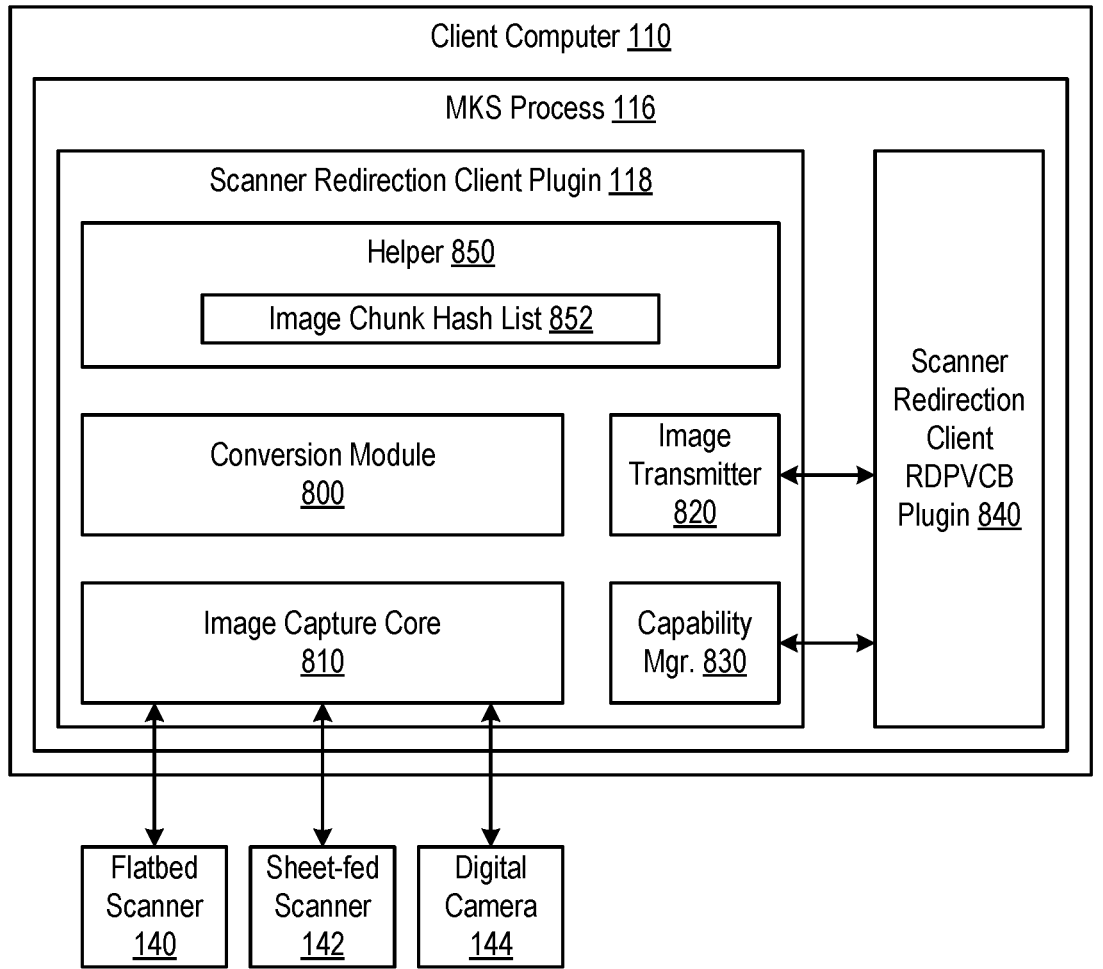
FIG. 8 is a block diagram of the client computer and the ICDs connected thereto, according to a second embodiment.

FIG. 8 is a block diagram of client computer 110 and the ICDs connected thereto, according to the second embodiment. According to the second embodiment, client computer 110 uses a different scanning protocol (e.g., the ICA framework) than that of VM 160. In the example of FIG. 8, there are three drivers (not shown) installed in client computer 110 for controlling the depicted ICDs: one for flatbed scanner 140, one for sheet-fed scanner 142, and one for digital camera 144.

In addition to scanner redirection client plugin 118, MKS process 116 includes a scanner redirection client RDPVCB plugin 840. Client RDPVCB plugin 840 is communication software that is configured to communicate with VM 160 via TCP or UDP channels. Client RDPVCB plugin 840 is also configured to communicate with an image transmitter 820 and a capability manager 830. Communication between scanner redirection client plugin 118 and individual components thereof and communication between the individual components, are facilitated via API calls.

Like the first embodiment, scanner redirection client plugin 118 includes image capturing software that communicates with the ICDs. However, according to the second embodiment, the image capturing software is an image capture core 810 instead of one or more DSs. To communicate with image capture core 810, scanner redirection client plugin 118 makes an API call to image capture core 810 to transmit commands thereto. Image capture core 810 then returns results to scanner redirection client plugin 118 via return values to the API call.

Unlike the first embodiment, scanner redirection client plugin 118 includes a helper 850, which provides similar functionality to helper plugin 270 of the first embodiment. When image capture core 810 acquires an image from an ICD, scanner redirection client plugin 118 makes an API call to helper 850. Helper 850 divides the image into a plurality of chunks of a predetermined size and generates a hash of each chunk. Helper 850 then stores each unique chunk in an image chunk hash list 852. For each unique chunk, upon receiving an API call, image transmitter 820 transmits the chunk to VM 160 via client RDPVCB plugin 840. For all chunks, image transmitter 820 also transmits the hash to VM 160 via client RDPVCB plugin 840.

Additionally, image capture core 810 may acquire capabilities from an ICD such as different supported resolutions for acquired images. Upon receiving an API call, capability manager 830 transmits the capabilities to VM 160 via client RDPVCB plugin 840. If the user specifies to adjust settings for a particular ICD, scanner redirection client plugin 118 instructs image capture core 810 to control the ICD to adjust those settings.

Because client computer 110 uses a different scanning protocol than that of VM 160, scanner redirection client plugin 118 includes a conversion module 800. Conversion module 800 converts data between the different scanning protocols. For example, if capability manager 830 receives a request from VM 160 to view capabilities of a particular ICD, then once image capture core 810 acquires those capabilities, conversion module 800 converts the capabilities to the scanning protocol of VM 160. Capability manager 830 then transmits them to VM 160. On the other hand, if capability manager 830 receives settings from VM 160 to apply to an ICD, scanner redirection client plugin 118 instructs conversion module 800 to convert the selected settings to the scanning protocol of client computer 110 to be understood by image capture core 810 and applied to the ICD.

Figure 9:
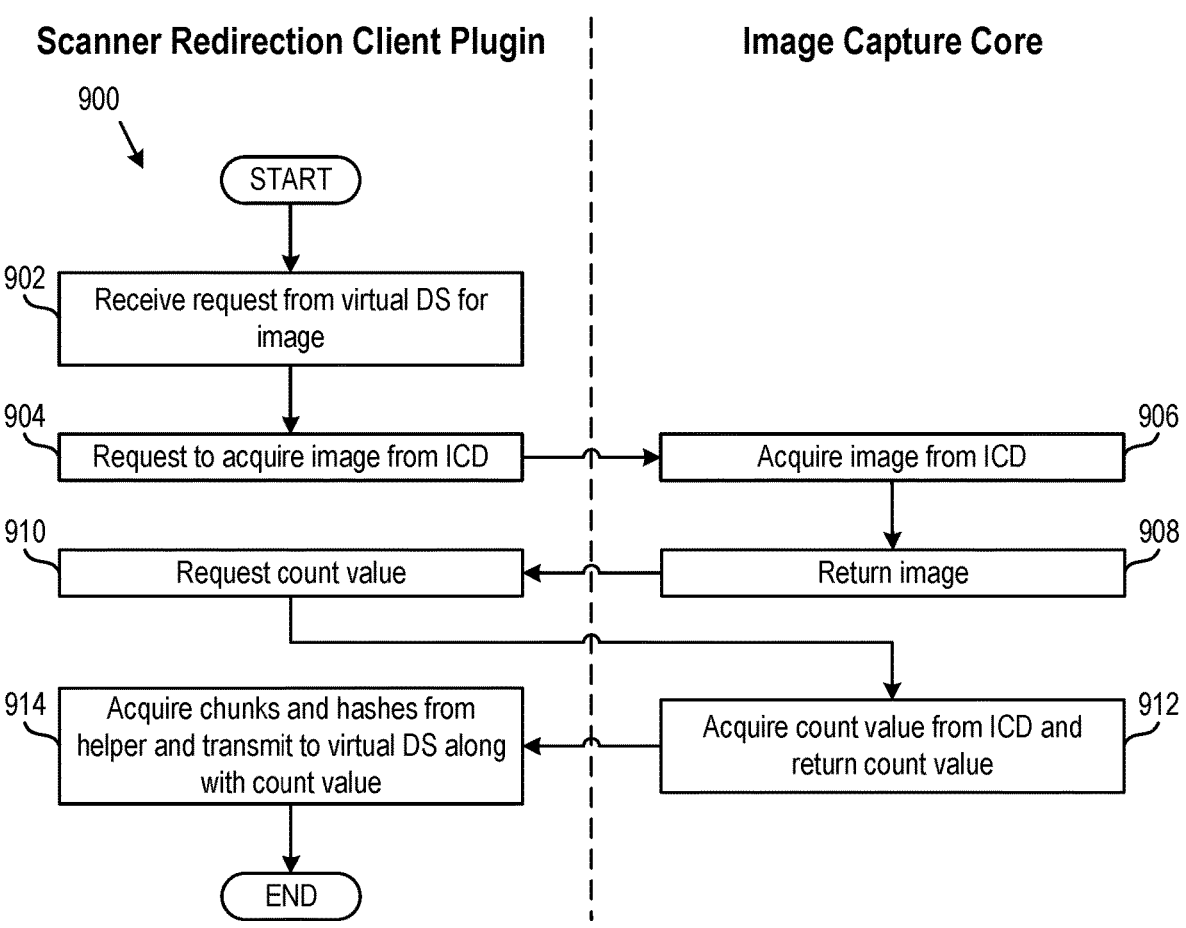
FIG. 9 is a flow diagram of a method performed by the client computer to acquire an image from a selected ICD, according to the second embodiment.

FIG. 9 is a flow diagram of a method 900 performed by client computer 110 to acquire an image from a selected ICD, according to the second embodiment. At step 902, scanner redirection client plugin 118 receives a request from virtual DS 310 of VM 160 to acquire an image. The request is received over a TCP or UDP channel between client RDPVCB plugin 840 and agent RDPVCB plugin 340. At step 904, scanner redirection client plugin 118 makes an API call to image capture core 810 to request image capture core 810 to acquire the image from a selected ICD. For example, if the user previously selected flatbed scanner 140 from ICD tray process 330, scanner redirection client plugin 118 has already provided this selection information to image capture core 810, which has resultingly already opened a communication session with flatbed scanner 140.

At step 906, image capture core 810 communicates with the selected ICD to acquire the image therefrom. At step 908, image capture core 810 provides the image to scanner redirection plugin 118 as a return value of the API call. At step 910, scanner redirection client plugin 118 makes another API call to image capture core 810 to request image capture core 810 for a count value. At step 912, image capture core 810 acquires the count value from the selected ICD, e.g., flatbed scanner 140, and provides the count value to scanner redirection client plugin 118 as a return value of the API call.

At step 914, scanner redirection client plugin 118 makes an API call to helper 850 to acquire chunks and hashes from helper 850 for the image. Scanner redirection client plugin 118 then transmits chunks and hashes to virtual DS 310 along with the count value. Step 914 is discussed further above in conjunction with FIG. 6. After step 914, method 900 ends. It should be noted that image capture core 810 acquires images from ICDs asynchronously. For example, image capture core 810 may acquire multiple images and return them to scanner redirection client plugin 118 before scanner redirection client plugin 118 requests the count value at step 910.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are magnetic drives, SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop system, wherein the remote desktop system includes a client computer and a remote computer, and the client computer has a remote desktop session with the remote computer, and wherein the client computer transmits actions by a user of the client computer to the remote computer to update a remote desktop of the remote desktop session, and the remote computer transmits images of the remote desktop to the client computer, the scanner redirection method comprising:

transmitting, by the remote computer in response to a selection communicated by the client computer to the remote computer, a request to the client computer, the request by the remote computer to the client computer indicating to acquire a first image from a flatbed scanner or sheet-fed scanner, and the flatbed scanner or sheet-fed scanner being connected to the client computer;

in response to receiving image data from the client computer of a first chunk of the first image and an identifier (ID) of the first chunk, storing, by the remote computer, the image data of the first chunk and the ID of the first chunk in association with each other, the first image having been acquired by the client computer from the flatbed scanner or sheet-fed scanner;

in response to receiving an ID from the client computer of a second chunk of the first image without any associated image data, retrieving, by the remote computer, image data of the second chunk that is stored by the remote computer in association with the ID of the second chunk; and creating, by the remote computer, the first image using the image data of the first chunk and the retrieved image data of the second chunk.

2. The scanner redirection method of claim 1, wherein the ID of the first chunk is a hash of the image data of the first chunk, and the ID of the second chunk is a hash of the image data of the second chunk.

3. The scanner redirection method of claim 1, wherein the ID of the second chunk and the image data of the second chunk are stored by the remote computer in a first data structure in which the ID of the second chunk is a key, and the image data of the second chunk is a value corresponding to the ID of the second chunk.

4. The scanner redirection method of claim 1, wherein the client computer divides the first image into a plurality of chunks including the first chunk and the second chunk.

5. The scanner redirection method of claim 1, wherein the client computer transmits the image data of the first chunk and the ID of the first chunk to the remote computer upon determining that no image data identical to the image data of the first chunk was previously transmitted by the client computer to the remote computer, and the client computer transmits the ID of the second chunk to the remote computer upon determining that image data identical to the image data of the second chunk was previously transmitted by the client computer to the remote computer.

6. The scanner redirection method of claim 1, further comprising:

transmitting, by the remote computer to the client computer, a request to acquire a second image from the flatbed scanner or sheet-fed scanner;

in response to receiving an ID from the client computer of a third chunk of the second image without any associated image data, retrieving, by the remote computer, image data of the third chunk that is stored by the remote computer in association with the ID of the third chunk; and creating, by the remote computer, the second image using the retrieved image data of the third chunk.

7. A non-transitory computer-readable medium comprising instructions that are executable in a remote desktop system that includes a client computer and a remote computer, wherein the client computer has a remote desktop session with the remote computer, wherein the client computer transmits actions by a user of the client computer to the remote computer to update a remote desktop of the remote desktop session, and the remote computer transmits images of the remote desktop to the client computer, and wherein the instructions when executed cause the remote desktop system to carry out a scanner redirection method comprising:

transmitting, by the remote computer in response to a selection communicated by the client computer to the remote computer, a request to the client computer, the request by the remote computer to the client computer indicating to acquire a first image from a flatbed scanner or sheet-fed scanner, and the flatbed scanner or sheet-fed scanner being connected to the client computer;

in response to receiving image data from the client computer of a first chunk of the first image and an identifier (ID) of the first chunk, storing, by the remote computer, the image data of the first chunk and the ID of the first chunk in association with each other, the first image having been acquired by the client computer from the flatbed scanner or sheet-fed scanner;

in response to receiving an ID from the client computer of a second chunk of the first image without any associated image data, retrieving, by the remote computer, image data of the second chunk that is stored by the remote computer in association with the ID of the second chunk; and creating, by the remote computer, the first image using the image data of the first chunk and the retrieved image data of the second chunk.

8. The non-transitory computer-readable medium of claim 7, wherein the ID of the first chunk is a hash of the image data of the first chunk, and the ID of the second chunk is a hash of the image data of the second chunk.

9. The non-transitory computer-readable medium of claim 7, wherein the ID of the second chunk and the image data of the second chunk are stored by the remote computer in a first data structure in which the ID of the second chunk is a key, and the image data of the second chunk is a value corresponding to the ID of the second chunk.

10. The non-transitory computer-readable medium of claim 7, wherein the client computer divides the first image into a plurality of chunks including the first chunk and the second chunk.

11. The non-transitory computer-readable medium of claim 7, wherein the client computer transmits the image data of the first chunk and the ID of the first chunk to the remote computer upon determining that no image data identical to the image data of the first chunk was previously transmitted by the client computer to the remote computer, and the client computer transmits the ID of the second chunk to the remote computer upon determining that image data identical to the image data of the second chunk was previously transmitted by the client computer to the remote computer.

12. The non-transitory computer-readable medium of claim 7, wherein the scanner redirection method further comprises:

transmitting, by the remote computer to the client computer, a request to acquire a second image from the flatbed scanner or sheet-fed scanner;

in response to receiving an ID from the client computer of a third chunk of the second image without any associated image data, retrieving, by the remote computer, image data of the third chunk that is stored by the remote computer in association with the ID of the third chunk; and creating, by the remote computer, the second image using the retrieved image data of the third chunk.

13. A remote computer of a remote desktop computer system, wherein the remote desktop computer system includes a client computer and the remote computer, and the client computer has a remote desktop session with the remote computer, wherein the client computer transmits actions by a user of the client computer to the remote computer to update a remote desktop of the remote desktop session, and the remote computer transmits images of the remote desktop to the client computer, and wherein the remote computer is configured to execute on a processor of a hardware platform to:

transmit, in response to a selection communicated by the client computer to the remote computer, a request to the client computer, the request by the remote computer to the client computer indicating to acquire a first image from a flatbed scanner or sheet-fed scanner, and the flatbed scanner or sheet-fed scanner connected to the client computer;

in response to receiving image data from the client computer of a first chunk of the first image and an identifier (ID) of the first chunk, store the image data of the first chunk and the ID of the first chunk in association with each other, the first image having been acquired by the client computer from the flatbed scanner or sheet-fed scanner;

in response to receiving an ID from the client computer of a second chunk of the first image without any associated image data, retrieve image data of the second chunk that is stored by the remote computer in association with the ID of the second chunk; and create the first image using the image data of the first chunk and the retrieved image data of the second chunk.

14. The remote computer of claim 13, wherein the ID of the first chunk is a hash of the image data of the first chunk, and the ID of the second chunk is a hash of the image data of the second chunk.

15. The remote computer of claim 13, wherein the ID of the second chunk and the image data of the second chunk are stored by the remote computer in a first data structure in which the ID of the second chunk is a key, and the image data of the second chunk is a value corresponding to the ID of the second chunk.

16. The remote computer of claim 13, wherein the client computer divides the first image into a plurality of chunks including the first chunk and the second chunk.

17. The remote computer of claim 13, wherein the client computer transmits the image data of the first chunk and the ID of the first chunk to the remote computer upon determining that no image data identical to the image data of the first chunk was previously transmitted by the client computer to the remote computer, and the client computer transmits the ID of the second chunk to the remote computer upon determining that image data identical to the image data of the second chunk was previously transmitted by the client computer to the remote computer.

18. The scanner redirection method of claim 5, wherein the client computer stores, in a second data structure, IDs of unique chunks of images acquired by the client computer from the flatbed scanner or sheet-fed scanner, the client computer determines that no image data identical to the image data of the first chunk was previously transmitted by the client computer by comparing the ID of the first chunk to the IDs of unique chunks of images in the second data structure, and the client computer determines that image data identical to the image data of the second chunk was previously transmitted by the client computer by locating the ID of the second chunk in the second data structure.

19. The non-transitory computer-readable medium of claim 11, wherein the client computer stores, in a second data structure, IDs of unique chunks of images acquired by the client computer from the flatbed scanner or sheet-fed scanner, the client computer determines that no image data identical to the image data of the first chunk was previously transmitted by the client computer by comparing the ID of the first chunk to the IDs of unique chunks of images in the second data structure, and the client computer determines that image data identical to the image data of the second chunk was previously transmitted by the client computer by locating the ID of the second chunk in the second data structure.

20. The remote computer of claim 17, wherein the client computer stores, in a second data structure, IDs of unique chunks of images acquired by the client computer from the flatbed scanner or sheet-fed scanner, the client computer determines that no image data identical to the image data of the first chunk was previously transmitted by the client computer by comparing the ID of the first chunk to the IDs of unique chunks of images in the second data structure, and the client computer determines that image data identical to the image data of the second chunk was previously transmitted by the client computer by locating the ID of the second chunk in the second data structure.

* * * * *